(12) United States Patent
Dorum (10) Patent No.: US 10,538,250 B2
(45) Date of Patent: Jan. 21, 2020

(54) ROAD GEOMETRY GENERATION FROM SPARSE DATA

(71) Applicant: HERE Global B.V., Eindhoven (NL)

(72) Inventor: Ole Henry Dorum, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 1133 days.

(21) Appl. No.: 14/338,811

(22) Filed: Jul. 23, 2014

(65) Prior Publication Data

US 2016/0023661 A1 Jan. 28, 2016

(51) Int. Cl.
*B60W 40/06* (2012.01)

(52) U.S. Cl.
CPC ................... *B60W 40/06* (2013.01)

(58) Field of Classification Search
CPC .................................................. B60W 40/06
USPC ........................................................ 702/167
See application file for complete search history.

(56) References Cited

U.S. PATENT DOCUMENTS

| | | | |
|---|---|---|---|
| 6,029,173 A * | 2/2000 | Meek | G01C 21/32 707/696 |
| 8,538,682 B1 | 9/2013 | Vankatraman et al. | |
| 2001/0034588 A1 * | 10/2001 | Agrawals | G01C 21/36 703/2 |
| 2007/0288158 A1 * | 12/2007 | Dorum | G01C 21/26 701/410 |
| 2008/0208454 A1 * | 8/2008 | Pesterev | G01C 21/16 701/467 |
| 2011/0029235 A1 * | 2/2011 | Berry | G01C 21/005 701/408 |
| 2013/0328863 A1 | 12/2013 | Pirwani | |
| 2014/0236482 A1 * | 8/2014 | Dorum | G01C 21/32 701/533 |

OTHER PUBLICATIONS

Biagioni et al., Inferring Road Maps from GPS Traces: Survey and Comparative Evaluation, Nov. 15, 2011, 91st Annual Meeting of the Transportation Research Board.
Hasberg, C. et al., *Integrating Spline Curves in Road Constraint Object Tracking*, Proceedings of the 11$^{th}$International IEEE Conference on Intelligent Transportation Systems (Oct. 2008), 1009-1014.
Jo, K. et al., *Generation of a Precise Roadway Map for Autonomous Cars*, IEEE Transactions on Intelligent Transportation Systems, vol. 15. No. 3 (Jun. 2014) 925-937.
Pylvanainen, T. et al., *3D City Modeling From Street-Level Data for Augmented Reality Applications*, 2012 Second International Conference on 3D Imaging, Modeling, Processing, Visualization & Transmission (Oct. 2012) 8 pages.
Toch, S. T., *Computer-Assisted Creation of 3D Models of Freeway Interchanges*, International Symposium on Visual Computing (2010) 12 pages.

* cited by examiner

*Primary Examiner* — Ricky Ngon
(74) *Attorney, Agent, or Firm* — Alston & Bird LLP (57) ABSTRACT

Road geometries may be determined from sparse data by identifying a set of mobile device data points generated by a mobile device located in a geographic area. Further, the data points may be connected with a curve comprising a series of splines defined by curve functions. The shape of the splines may be optimized by applying a scaling factor to the curve functions. A resulting optimized curve may be representative of a road in a geographic area.

18 Claims, 7 Drawing Sheets

ROAD GEOMETRY GENERATION FROM SPARSE DATA

FIELD

The following disclosure relates to road geometry generation, and more specifically to road geometry generation from a collection of mobile device data related to vehicles traveling a road system.

BACKGROUND

Roadway mapping of road systems provide information for travelers regarding the existence and availability of specific sections of roadways for travel. Manual mapping may involve a person traveling a roadway to determine the actual geometry of specific roads to generate mapped system. Further, roadways may change geometry occasionally as infrastructure updates and other roadway related projects are undertaken. Also, sending people to some global locations to generate mappings of roadways may be difficult. Therefore, accurately indicating the existence and actual geometry of roadways can require significant resources because of the sheer magnitude and number of roadways involved in global road systems as well as the logistical difficulties involved with sending people around the world to appropriately track changes and developments of road systems.

SUMMARY

In an embodiment, a method involves identifying a set of mobile device data points associated with a vehicle from a plurality of mobile device data points, the set of mobile device data points indicating a position, a heading, and a speed of the vehicle at particular times while traveling a road. The method also involves connecting the set of mobile device data points with a curve comprising a series of splines defined by curve functions using parameters derived from the position, the heading, and the speed for the plurality of mobile device data points. The method also may involve optimizing the curve by applying at least one scaling factor to the parameters, and associating the optimized curve with the road.

In an embodiment, an apparatus may involve at least one processor, and at least one memory including computer program code and operable to store a plurality of data points associated with a vehicle, the plurality of data points generated by a mobile device at particular times while traveling a road. The at least one memory and the computer program code are configured to, with the at least one processor, cause the apparatus at least to connect the data points with a curve comprising a series of splines defined by curve functions using mobile device data generated by the mobile device, optimize the shape of the splines by applying a scaling factor to the curve functions, and associate the optimized curve with the road.

In an embodiment, a non-transitory computer readable medium including instructions that when executed on a computer are operable to identify a set of mobile device data points generated by a mobile device located in a geographic area. The instructions may also be operable to connect the data points with a curve comprising a series of splines defined by curve functions. The instructions may also be operable to optimize the shape of the splines by applying at least one scaling factor to the curve functions, and associate the optimized curve with a path in the geographic area.

BRIEF DESCRIPTION OF THE DRAWINGS

Example embodiments of the present invention are described herein with reference to the following drawings.

DETAILED DESCRIPTION

Road geometries may be determined automatically using a collection of data from mobile devices associated with vehicles traveling roadways. The collection of data may involve a significant number of data points gathered over a period of time. The collection of data may be analyzed to determine a set of mobile device data points associated with a particular vehicle traveling a road. The mobile device data points may be connected using vehicle position, trajectory, velocity, and/or heading data of the data points to generate a curve of the vehicle path by creating splines between data points. Further, the curve shape may be optimized by modifying parameters for each spline segment of the curve. The spline parameters may be modified by applying a scaling factor to magnitudes of the heading vector parameters associated with the points used to create the splines. The resulting vehicle path may be considered representative of a road that the vehicle was traveling upon. Also, other sets of the collection of mobile device data may be associated with other vehicles and multiple optimized vehicle path curves may be generated for the road. These multiple paths may be combined to better represent the road geometry being traveled by the vehicles. When associated with a road in a road network, an autonomous vehicle or an advanced driver assistance system ("ADAS") may use the resulting vehicle paths to aid in the control and/or guidance of a vehicle.

Figure 1:
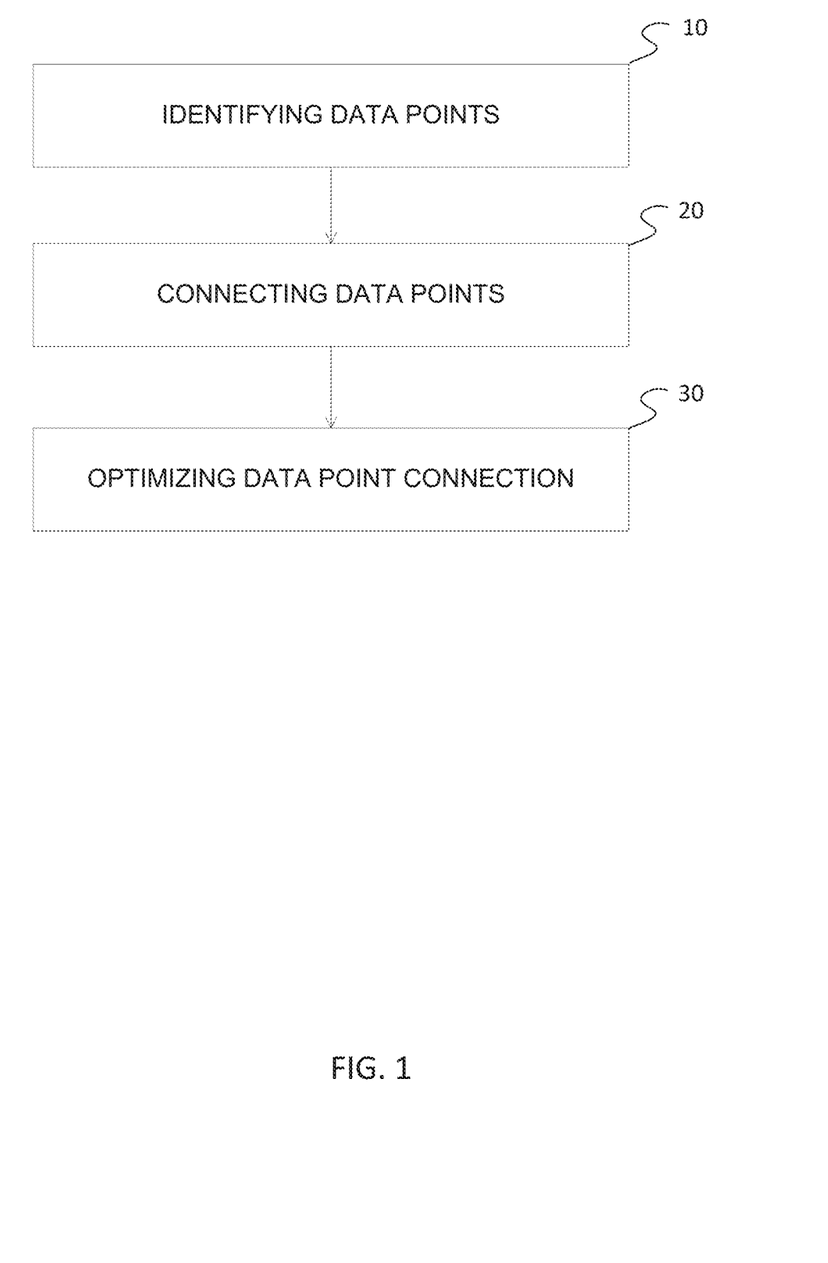
FIG. 1 illustrates a flow chart of an example embodiment for road or path geometry generation from sparse data.

FIG. 1 illustrates a flow chart of an example embodiment for road geometry generation from sparse data. As presented in the following sections, the acts may be performed using any combination of the components indicated in FIG. 4, FIG. 5, or FIG. 6. For example the term controller may refer to either controller 200 or processor 300 and the following acts may be performed by mobile device 122, server 125, a vehicle 401, or a combination thereof. Additional, different, or fewer acts may be provided. The acts are performed in the order shown or other orders. The acts may also be repeated.

In act 10, data points are identified. The data points may be data points gathered by a mobile device associated with a vehicle traveling through a geographic area. The mobile device may be any device operable to provide the data points, such as the mobile device 122 as described with respect to FIGS. 4 and 5. The data points may involve any collection of data descriptive of the movement and/or location of the mobile device. For example, the data points may involve location data, heading data, speed data, and/or orientation data for the mobile device. The mobile data may also involve time data indicative of a time that the mobile data point was acquired, such as a time stamp or other similar data.

The data points may be identified from sparse data. Sparse data may involve a collection of many data points received from mobile devices in a geographic area over a period of time. As such, the data points may be generated by multiple mobile devices. Each of the multiple devices may be associated with different particular vehicles. Data identifying the mobile device may also be included in the data point. For example, text indicating a device identification number or code may be included in the data. From such mobile device identification data, data relating to a single device may be identified from sparse data, as well as any other collection of data from multiple mobile devices.

Over time, each mobile device may have traveled through the geographic area multiple times. Each particular time a vehicle travels through the geographic area may be considered a trip. Also, each trip may involve a different associated vehicle. Particular trips for a mobile device may be determined from a collection of data points by grouping mobile data points temporally. For example, a data point from a particular trip will include time data, and this time data may be temporally proximate to other data points from a particular trip. Using a combination of mobile device identification data and temporal grouping may further allow particular trips to be identified.

In act 20, data points may be connected. The data points may be the data points identified in act 10. The data points may be connected using any technique. For example, curves may be generated between temporally successive data points. Connecting temporally successive data points may generate a curve that is representative of a path that a vehicle traveled during a trip through the geographic area. Any technique for generating a curve based on a series of data points may be used. For example, a curve may involve parameters that define a shape of a curve, such as is used in a parametric equation representing a curve or a spline. In an embodiment, the shape of the curve may further be determined by parameters determined from movement and/or location data of the data points. For example, the positions for each data point may be provided and used as geometric placement data for particular positions of the curve such that the curve passes through or within a determined proximity to each of the data points. In an embodiment, the values provided by the data of the data point may be used as values for the generation of a function that defines a curve connecting two points. In this way, velocity and/or heading data as well as time differences between successive points may be used to determine specific shapes of the curve between data points. For example, if heading data of a data point indicates that a mobile device was traveling west at a time the data point was generated, and the next successive data point for the trip is southwest of the data point, connecting these two data points will involve a curve of some type. Further, if heading data of the second point indicates that the mobile device was traveling south at a time the data point was generated, the shape of the curve between the two points may be implied to involve an arc that transitions from west to south between the two points.

In act 30, the connection of the data points may be optimized. The connection may be optimized using any technique. In an embodiment, the connection is optimized to better approximate a path traveled by a vehicle associated with the mobile device that generated the data identified in act 10. In an embodiment, the path may be representative of a road traveled upon by the vehicle. For example, a shape of a curve generated to connect the data points may be adjusted such that a maximum number of the total collection of data points for the geographic area from which the data points for a trip were identified are located within a specified distance from the curve. Adjusting the shape of the curve may involve any technique. For example, scaling factors may be applied to parameters used in a function to define curves connecting data points. As such, the parameter values modified by the scaling factors may adjust the shape of the connecting curves.

In an embodiment, an optimized connecting curve may be used as a representation of a road upon which the mobile device was traveling during the trip for the identified data points. The representation may be stored with other representations of roads in a road network represented in a geographic database 123, as is described further with respect to FIG. 4 and FIG. 6.

Figure 2:
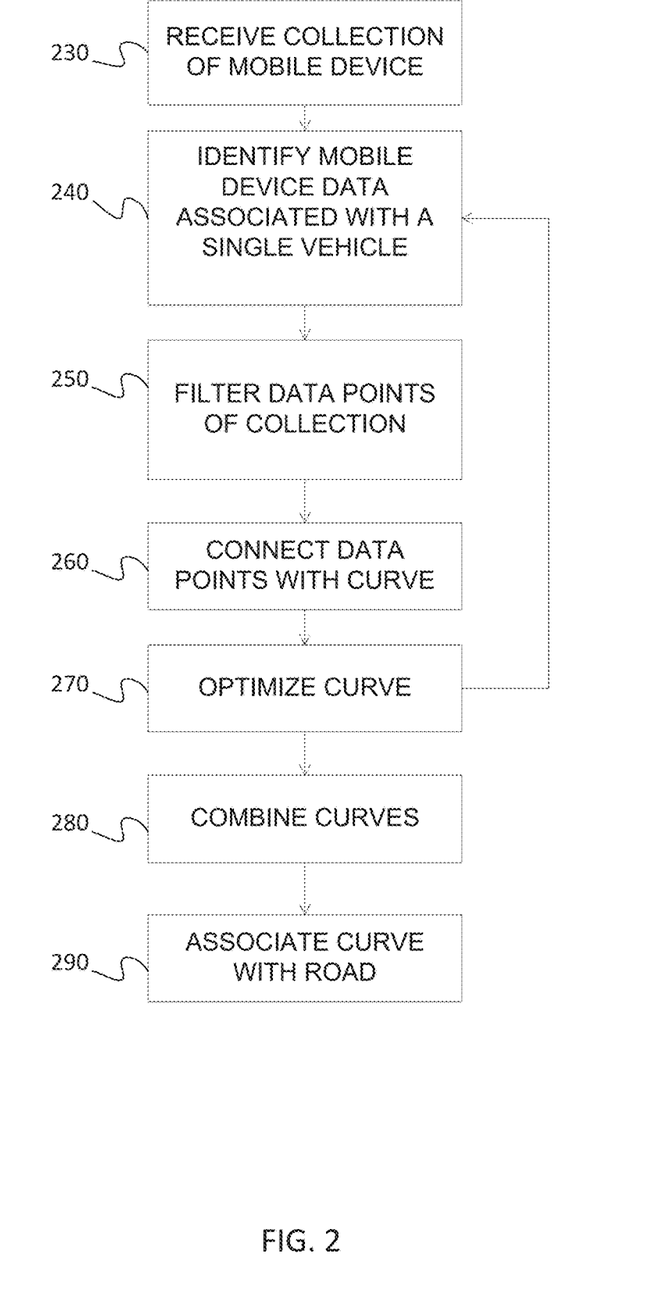
FIG. 2 illustrates a flow chart of an example embodiment for road geometry generation from sparse mobile device data acquired from a geographic area.

FIG. 2 illustrates a flow chart of an example embodiment for road geometry generation from sparse mobile device data acquired from a geographic area. As presented in the following sections, the acts may be performed using any combination of the components indicated in FIG. 4, FIG. 5, or FIG. 6. For example the term controller may refer to either controller 200 or processor 300 and the following acts may be performed by mobile device 122, server 125, a vehicle 401, or a combination thereof. Additional, different, or fewer acts may be provided. For example, act 250 may be omitted. The acts are performed in the order shown or other orders. For example, act 240 may be performed before, after, or during or after act 250. The acts may also be repeated. For example, acts 240, 260, and 270 may be repeated.

In act 230, a collection of mobile device data points is received. The collection may be received using any technique. For example, the collection may be received as a transfer of data onto a memory 301 as is described with respect to FIG. 6. The collection may involve data generated by multiple mobile devices traveling through a geographic area over a period of time. The data generated by the multiple mobile devices may be motion, location and/or elevation data representative of paths traveled through the geographic area by the mobile devices. Further, the mobile devices may be associated with vehicles and the paths traveled through the geographic area, and the data generated thereby may be representative of roadways or roads used by the vehicles to travel through the geographic area.

In an embodiment, the mobile device data points may be supplemented with other data from other sources. For example, two dimensional position data may be correlated to elevation data from a terrain or elevation model that includes the position of the mobile device data point. As such, a two dimensional cartographic position for a data point may be transformed into a three dimensional position in space for the mobile device data point. A transformed three dimensional position may be used as mobile device data. In another embodiment, a mobile device may provide data points that contain three dimensional position and/or velocities headings in three-dimensional space. For example, cartographic coordinates may be determined as location information for the mobile device and coupled with elevation data provided by the mobile device.

In act 240 mobile device data points of a single mobile device may be identified from the collection of mobile data points. Also, the single mobile device may be associated with a single vehicle. Further, the identified mobile data points may be determined to be from a single trip through the geographic area for the mobile device. Mobile device data identified as being generated by a particular mobile device and/or associated with a particular trip through the geographic region may be grouped into sets of mobile device data points.

The mobile device data may be identified using any technique operable to associate mobile device data points with a mobile device. For example, the mobile device data points may include data indicating a code or characters designating an individual device identification. The sets may be extracted from the collection of data and stored as data separate from the collection of mobile device data, for example using the memory 301 as discussed below with respect to FIG. 6.

In act 250, the collection of mobile device data points may be filtered. The collection of data may be filtered to remove data points that are not useful for subsequent analysis or to remove data points that are not indicative of vehicles traveling roads. Such data points may be considered invalid data points. Any technique may be used to filter the collection of data. For example, specific criteria may indicate that data points of the collection are not indicative of vehicles traveling roads. In an embodiment, speeds of data points may be used to filter data points. For example, data points indicating a speed of a mobile device below an established minimum speed threshold, such as one kilometer per hour, may be filtered. In an embodiment, data points have a speed at or near zero kilometers per hour may be filtered. Other criteria may be used to filter data points as well. For example, a distance and time between successive points may indicate that an excessive or unreasonable speed may be required to travel between the two points. Also for example, a time difference between two temporally successive data points that belong to a particular mobile device may be determined and compared to a maximum time difference threshold, such as five minutes. A time difference that is too large increases the probability that a mobile device has traveled a significant distance, traveled a complex route, or did not have an intermediate data point in the collection of data. Such data points are less useful for subsequent processing.

In an embodiment, a line may be determined between two sequential data points and if a heading direction of a data point is not consistent with this line the data point may be determined to be invalid. For example, a heading direction of a data point may vary from the connecting line by more than an angular threshold value. Similarly, if an embodiment were to include an elevation value for data points, a slope of a heading may vary from the horizontal plane or from a connecting line by more than a slope threshold value. Such mobile data points having slopes exceeding the slope threshold value may be indicative of improperly oriented mobile devices and/or other data errors, and be considered invalid.

Also, as indicated below, curves or splines may be used to connect data points, and these curves may include errors when generated. Data points that result in erred curves may be removed. For example, a curve connecting two data points may imply an excessive or unrealistic speed required by a mobile device to travel the curve through the geographic area. Such a speed determination may result from an erred curve.

In act 260, the identified data points may be connected with a curve. The data points may be connected using any type of curve or curve generating technique. In an embodiment, the curve involves a series of splines connecting data points. Further, the splines may be defined by curve functions established using values from the data points being connected. By establishing splines between each successive pair of mobile data points, a contiguous curve defined by the splines may be generated to connect the mobile device data points.

In an embodiment, splines may be determined as Cubic Hermite Spline Curves. For example, the splines may be defined by a function represented in Equation 1.

$$p(t)=(2t^3-3t^2+1)p_0+(t^3-2t^2+t)m_0+(-2t^3+3t^2)p_1+(t^3-t^2)m_1 \quad \text{Equation 1}$$

In Equation 1, t is a spline variable between a first mobile device data point, $p_0$, of sequential pair of data points of a set and a second mobile device data point, $p_0$, of the sequential pair of data points of the set. In an embodiment, t increments from 0 to 1, $t \in [0, 1]$, from the first to the second mobile device data point. For example, values for p(t) may be determined for t value increments of 0.01 from 0 to 1. Also in Equation 1, p(t) is a position at the given point on the curve, $p_0$ is an initial position of a spline indicated by the first mobile device data point, $p_1$ is an ending position of the spline indicated by the second mobile device data point. $m_0$ and $m_1$ are spline end vectors derived from the heading parameters developed from mobile device data. In an embodiment, $m_0$ is a trajectory mobile device data point heading vector determined for the first mobile device data point, and $m_1$ is a trajectory mobile device data point heading vector determined for the second mobile device data point.

The trajectories, heading parameters or heading vectors may be determined by any technique. A trajectory may involve a speed and/or heading of a mobile device. A trajectory may be presented using any units. For example, a trajectory may indicate that a mobile device is traveling north at 50 meters per second. Further, heading vectors may be determined from the trajectory data. For example, direction and speed data may be used to determine a heading vector. In an embodiment a heading vector, $m_c$ of a particular mobile device data point c and $m_d$ of a particular mobile device data point d of a sequential pair of mobile device data points, c and d, are determined using velocity vector data of the data point d and a time differential between mobile device data points c and d. For example, the heading vectors for $m_c$ and $m_d$ may be determined using Equation 2 and Equation 3 respectively.

$$m_c=\Delta t_{d-c}(v_c) \quad \text{Equation 2}$$

$$m_d=\Delta t_{d-c}(v_d) \quad \text{Equation 3}$$

In Equation 2 and Equation 3, $v_c$ is a velocity value of the data point c, $v_d$ is a velocity value of the data point d, and $\Delta t_{d-c}$ is a time differential between mobile device data points c and d. In an embodiment, $v_c$ and $v_d$ may be vectors. As vectors, velocity values for component directions may be determined and used for heading determination in the component directions.

Further, specific directional components of the position p(t) may be determined using Equation 1 with values attributed to the directional components of a coordinate system in which splines are being determined. In an embodiment, a Cartesian coordinate system may be used and p(t) in the X direction and p(t) in the Y direction may be determined. In this embodiment, heading vectors, m, may be determined in each direction X and Y. To do this, a heading direction stored for mobile data point c is used as a directional component of a velocity vector having a magnitude of the value provided for the speed at point c. Further, in an embodiment involving elevation data for the mobile device data points, p(t) may be determined in three directions. For example p(t) in the X, Y, and Z directions may be determined from components of a heading vector for each direction. General trigonometric techniques may be used to dissect a the velocity vector into component values in component directions.

In act 270, the curve connecting the identified points may be optimized. The curve may be optimized using any technique. In an embodiment, the curve may be optimized by applying a scaling factor to the values of the mobile data points, or parameters derived from trajectories or other data of the mobile data points, used to define the curve. For example, a trajectory's heading vector may be multiplied by a value to adjust shape characteristics of individual splines of the curve. The value chosen as the scaling factor may be any value and may be different for each parameter of each spline of a curve. In an embodiment, a scaling factor may be selected from a range of values, such as 0.1 to 3.0, for each mobile data point of a spline. Further, each component value of a trajectory for a mobile device data point may be scaled equally to provide that no directional or angular distortion is provided by the application of the scaling factor. For example, the same scaling factor value may be applied to both the X and Y component speed values for a data point. In an embodiment, an application of scaling factors $k_0$ and $k_1$ to Equation 1 may provide for an equation used to define spline geometry of a curve using Equation 3. In another embodiment, the scaling factors, $k_0$ and $k_1$, may involve different scaling factors for the X and Y component velocities.

$$p(t)=(2t^3-3t^2+1)p_0+(t^3-2t^2+t)k_0m_0+(-2t^3+3t^2)p_1+(t^3-t^2)k_1m_1 \quad \text{Equation 3}$$

A specific scaling factor value for each mobile data point of the spline may be selected by determining which values for the scaling factors result in a spline that most appropriately represents a road that was traveled by the mobile device. This may result in a pair of scaling factor values, $k_0$ and $k_1$ for each spline. To do this, it may be recognized that other sets of mobile device data points from the collection of mobile device data points may be generated by mobile devices that also traveled the same road through the geographic area. Thus, to optimize a curve for a set of the collection of mobile device data points, scaling factors may be chosen that generate splines having the maximum number of mobile device data points within a specified distance (i.e. five meters) of an optimized curve resulting from the respective scaling factor application. To provide an effective optimization, scaling factors may be tried iteratively until an appropriate scaling factor is determined. For example, incremental values of the scaling factor may be applied until an appropriate scaling factor is determined. Also, any optimization technique may be applied to efficiently determine appropriate scaling factors. Alternately, all possible permutations of scaling factors of a range of possible scaling factors may be applied. Further, the collection of mobile device data points used for such an optimization determination may be a filtered collection of data, as is described above with respect to act 250. Also, specific data points of the collection may be used for the optimization determination. For example, mobile device data points having a similar (i.e. within five degrees) or same trajectory or heading as the closest mobile device data point of the curve being optimized, may be selected to be used for the optimization determination. In such a way, mobile device data points generated by mobile devices most likely to have traveled the same road may be used to optimize curves.

An optimized curve of a set of mobile device data points may represent a path through the geographic are taken by the mobile device, and as such may represent a path of a road through the geographic area.

Act 250, act 260, and act 270 may be repeated for sets of mobile device data generated by different mobile devices and/or runs. A collection of multiple curves representing paths of multiple mobile devices and/or runs through the geographic area may result. As such, multiple curves approximating a road through the geographic area may be generated.

In an embodiment, further accuracy in approximating a road may be achieved by combining multiple optimized curves in act 280. The curves may be combined or merged using any technique. For example, curve values of a set of curves along an axis may be averaged to determine an average curve value along the axis. The resulting curve may be considered a merged or combined curve.

In act 290, a resulting curve may be associated with a road in the geographic area. The curve may be associated with the road using any technique. For example, the curve may be used or associated in a geographic database, such as the geographic database 123 described below with respect to FIG. 6, to define a shape, geometry, and/or route of the road through the geographic area.

Figure 3A:
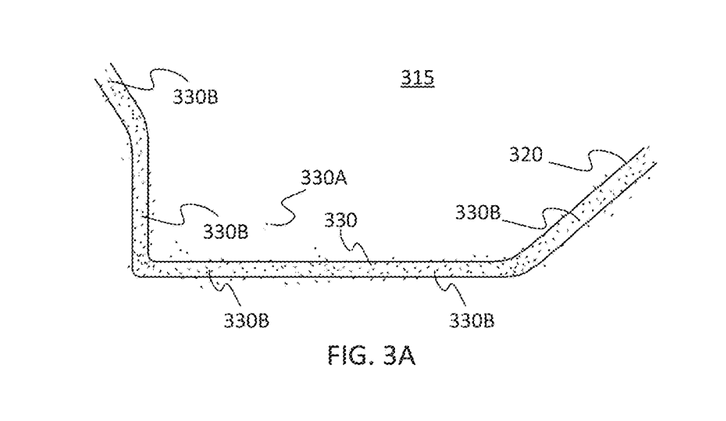
FIGS. 3A-E illustrate generation of road geometry from sparse mobile device data using spline curves.

FIGS. 3A-E illustrate the generation of road geometry from sparse mobile device data using spline curves. FIG. 3A illustrates a collection of multiple data points 330 generated by mobile devices in a geographic area 315. Most of the data points 330 are generated by mobile devices while traveling a road 320 in the geographic area, and thus consecutive data points generated by particular mobile devices may be indicative of a road through the geographic area 315. Some of the data points may not be indicative of the road through the geographic area 315. For example, a data point 330A may be located a beyond a maximum distance from other data points, or may have a velocity below a minimum velocity to be considered indicative of the road. Data points considered not indicative of the road may be filtered out of a collection of data points prior to processing the data points to determine road geometry.

Figure 3B:
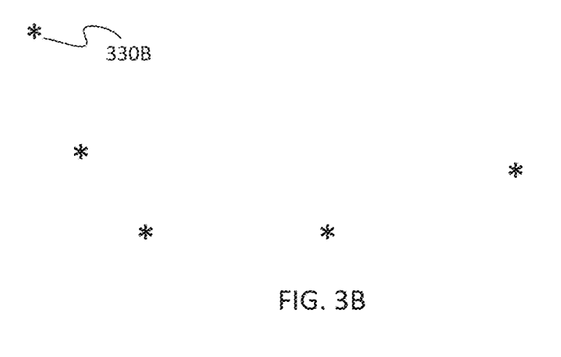
Figure 3C:
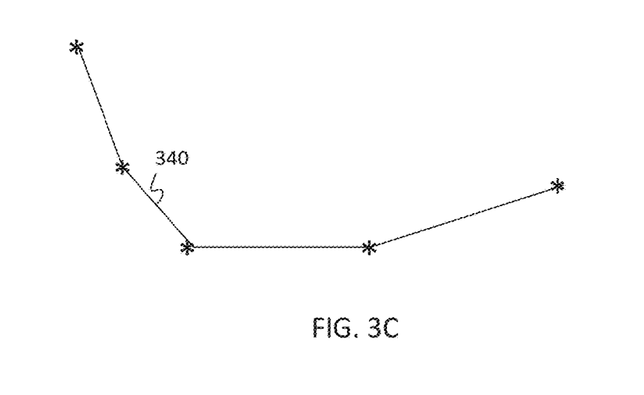

The data points 330 include data points 330B corresponding to a specific mobile device. The data points 330B of the specific mobile device may be extracted from the other data points as a set of data points as shown in FIG. 3B. The set of data points 330B may be connected to approximate the geometry of the road. FIG. 3C illustrates a connection of the set of data points 330B using pure trajectory data associated with the data points 330B. The connecting curves 340 are mostly straight, and provide for a general shape of the road 320.

Figure 3D:
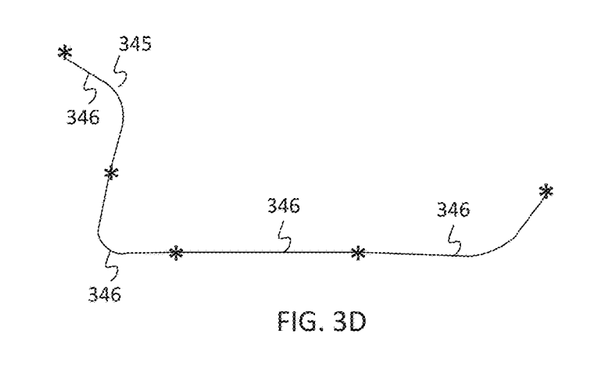

To better approximate the road geometry, curve functions may be applied to individual connections of data points to generate connecting splines 346. The collection of connecting splines 346 may be considered a curve 345. The specific shape of the splines may be the result of using trajectory or heading data of the data points to tailor the splines using the specific physics of the movement of the mobile devices as they traveled the road. For example, the trajectory or heading data may be used to generate Cubic Hermite Spline Curves for the connections 346 as indicated above. At this stage, the curve 345 better represents the road geometry than the connections 340 of FIG. 3C.

Figure 3E:
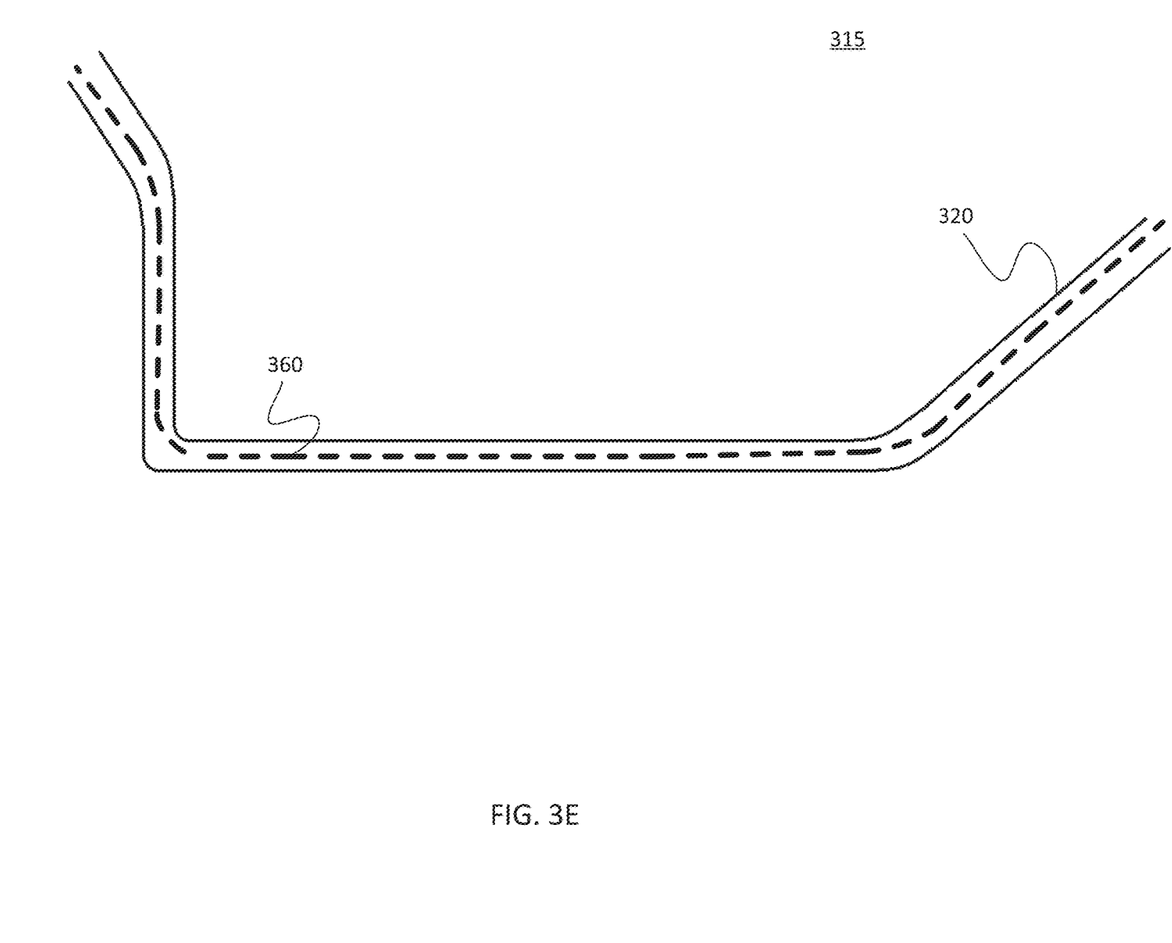

To further approximate the road geometry, the individual splines 346 may be optimized using scaling factors. A resulting optimized curve 360 as it relates to the road 320 in the geographic area 315 is illustrated in FIG. 3E.

Figure 4:
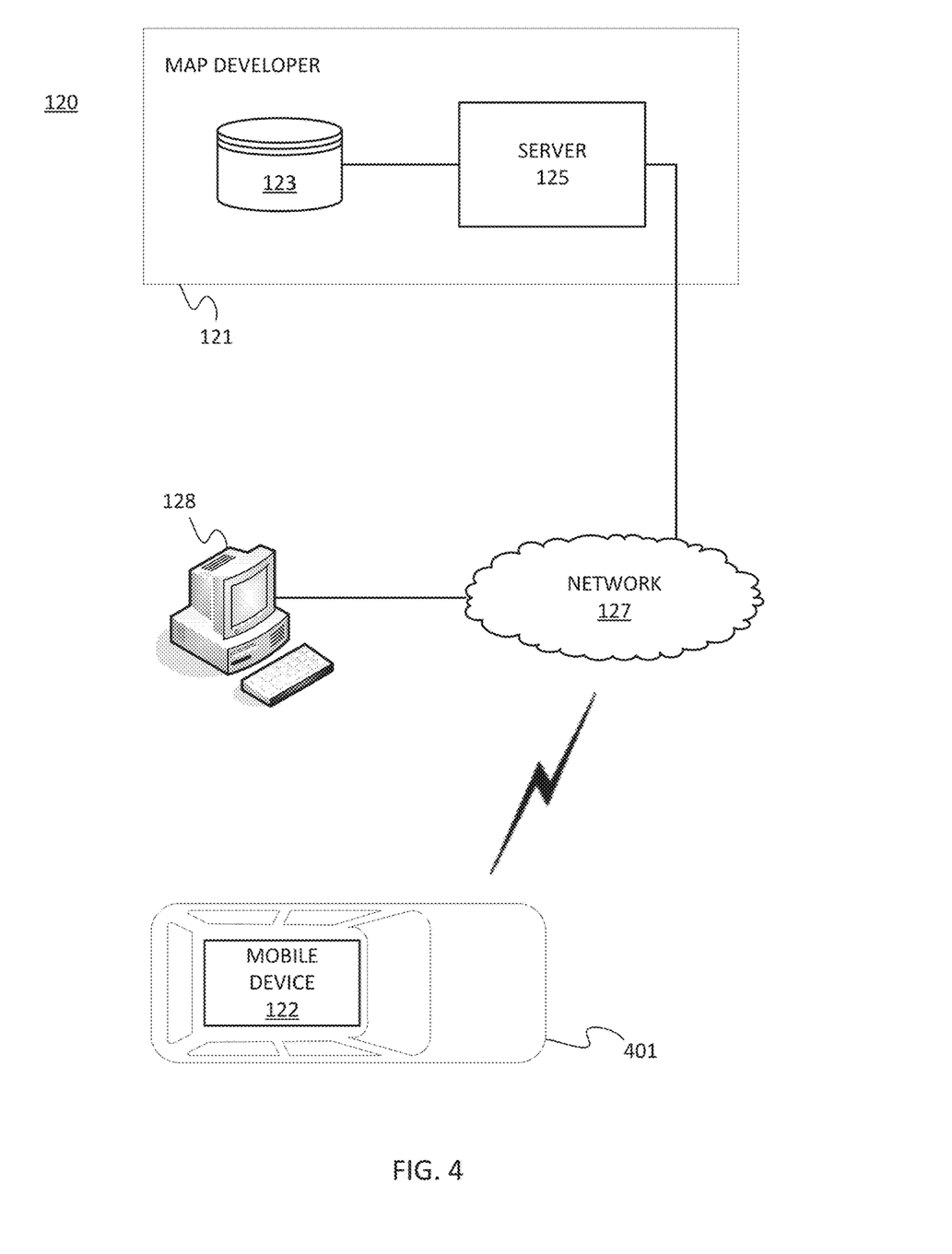
FIG. 4 illustrates an example system for road geometry generation from sparse data.

FIG. 4 illustrates an exemplary system 120 for road geometry generation. The system 120 may include includes a developer system 121, a mobile device 122, and a network 127. The mobile device 122 may be associated, coupled, or otherwise integrated with a vehicle 401. Additional, different, or fewer components may be provided. For example, many mobile devices 122 may connect with the network 127.

The developer system 121 includes a server 125 and a database 123. The developer system 121 may include computer systems and networks of a system operator such as HERE or NOKIA Corporation. The geographic database 123 may be partially or completely stored in the mobile device 122.

The developer system 121 and the mobile device 122 are coupled with the network 127. The phrase "coupled with" is defined to mean directly connected to or indirectly connected through one or more intermediate components. Such intermediate components may include hardware and/or software-based components.

The database 123 includes geographic data used for traffic, navigation, and/or assisted or automated driving related applications. The geographic data may include data representing a road network or system including road segment data and node data. The road segment data represent roads, and the node data represent the ends or intersections of the roads. The road segment data and the node data indicate the location of the roads and intersections as well as various attributes and geometries of the roads and intersections. Other formats than road segments and nodes may be used for the geographic data. The geographic data may include geometries of roads determine from sparse data as indicated above.

The mobile device 122 may include one or more detectors or sensors as a positioning system built or embedded into or within the interior of the mobile device 122. Alternatively, the mobile device 122 uses communications signals for position determination. The mobile device 122 receives location data from the positioning system. The server 125 may receive sensor data configured to describe a position of a mobile device, or a controller of the mobile device 122 may receive the sensor data from the positioning system of the mobile device 122. The mobile device 122 may also include a system for tracking mobile device movement, such as rotation, velocity, or acceleration. Movement information may also be determined using the positioning system. The mobile device 122 may use the detectors and sensors to provide data indicating a location of a vehicle.

The mobile device 122 may communicate location and movement information via the network 127 to the server 125. The server 125 may use the location and movement information received from the mobile device 122 to associate the mobile device 122 with a geographic region, or a road of a geographic region, described in the geographic database 123. Server 125 may also associate the mobile device 122 with a geographic region, or a road of a geographic region, manually.

The server 125 may receive location and movement information from multiple mobile devices 122 over the network 127. The location and movement information may be in the form of mobile device data or data points. The server 124 may compare the mobile device data with data of a road system stored in the database 123. In this way, the positions of vehicles associated with the mobile devices 122 may be determined relative to a road network or a geographic area.

The computing resources for road geometry generation may be divided between the server 125 and the mobile device 122. In some embodiments, the server 125 performs a majority of the processing. In other embodiments, the mobile device 122 performs a majority of the processing. In addition, the processing is divided substantially evenly between the server 125 and the mobile device 122. For example, data may be collected by the mobile device 122 and road geometry may be generated by the server 125.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

Figure 5:
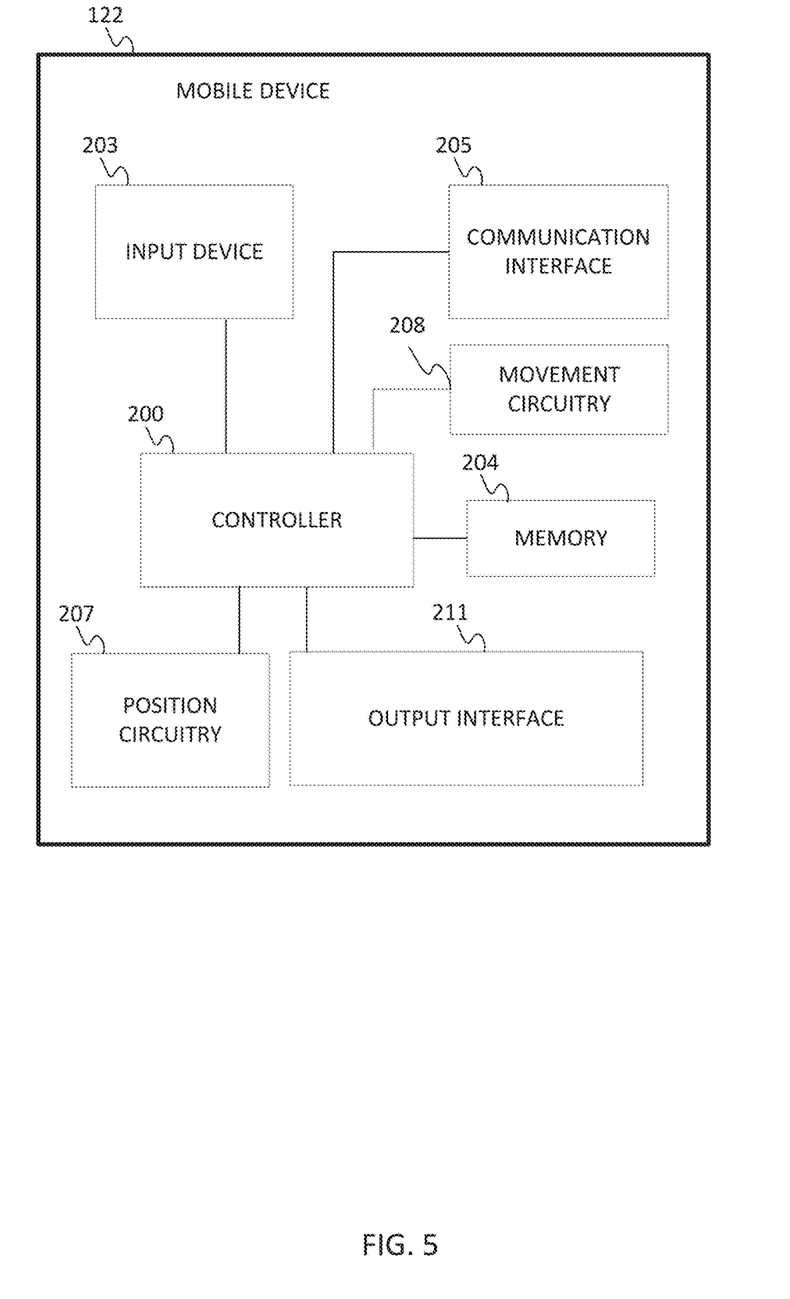
FIG. 5 illustrates an example mobile device of the system of FIG. 4.

FIG. 5 illustrates an exemplary mobile device of the system of FIG. 4. The mobile device 122 includes a controller 200, a memory 204, an input device 203, a communication interface 205, position circuitry 207, movement circuitry 208, and an output interface 211. The output interface 211 may present visual or non-visual information such as audio information. Additional, different, or fewer components are possible for the mobile device 122. The mobile device 122 is a smart phone, a mobile phone, a personal digital assistant (PDA), a tablet computer, a notebook computer, a personal navigation device (PND), a portable navigation device, an assisted driving device, an automated driving or control device, and/or any other known or later developed mobile device. The positioning circuitry 207, which is an example of a positioning system, is configured to determine a geographic position of the mobile device 122. The movement circuitry 208, which is an example a movement tracking system, is configured to determine movement of a mobile device 122 but may operate in place of, or in correlation with, other movement sensors and/or circuitry integrated with a vehicle associated with the mobile device 122. The position circuitry 207 and the movement circuitry 208 may be separate systems, segments of the same positioning or movement circuitry system, or integrated systems of a vehicle associated or otherwise integrated with the mobile device. In an embodiment, components as described herein with respect to the mobile device 122 may be implemented as a vehicle.

In an embodiment, the memory 204 may be operable to store a plurality of data points associated with a vehicle. The plurality of data points may be generated by a mobile device at particular times while traveling a road or path through a geographic area. Also, the controller 200 may be configured to cause a mobile device 122 to connect the data points with a curve involving a series of splines defined by curve functions using mobile device data, and optimize the shape of the splines by applying a scaling factor to the curve functions.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122 or a vehicle associated with the mobile device 122.

The movement circuitry 208 may include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device. The movement circuitry 208 may be used alone, or with the positioning circuitry 207 to determine mobile device 122 movement.

Positioning and movement data obtained from a mobile device may be considered geographic data, device data, other data, and/or mobile device data, and may be used to determine road geometries The input device 203 may be one or more buttons, keypad, keyboard, mouse, stylus pen, trackball, rocker switch, touch pad, voice recognition circuit, or other device or component for inputting data to the mobile device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers.

The communication interface 205 is configured to send data such as mobile device movement and position data to a server 125. The position circuitry 207 is configured to determine the current location of the mobile device.

Figure 6:
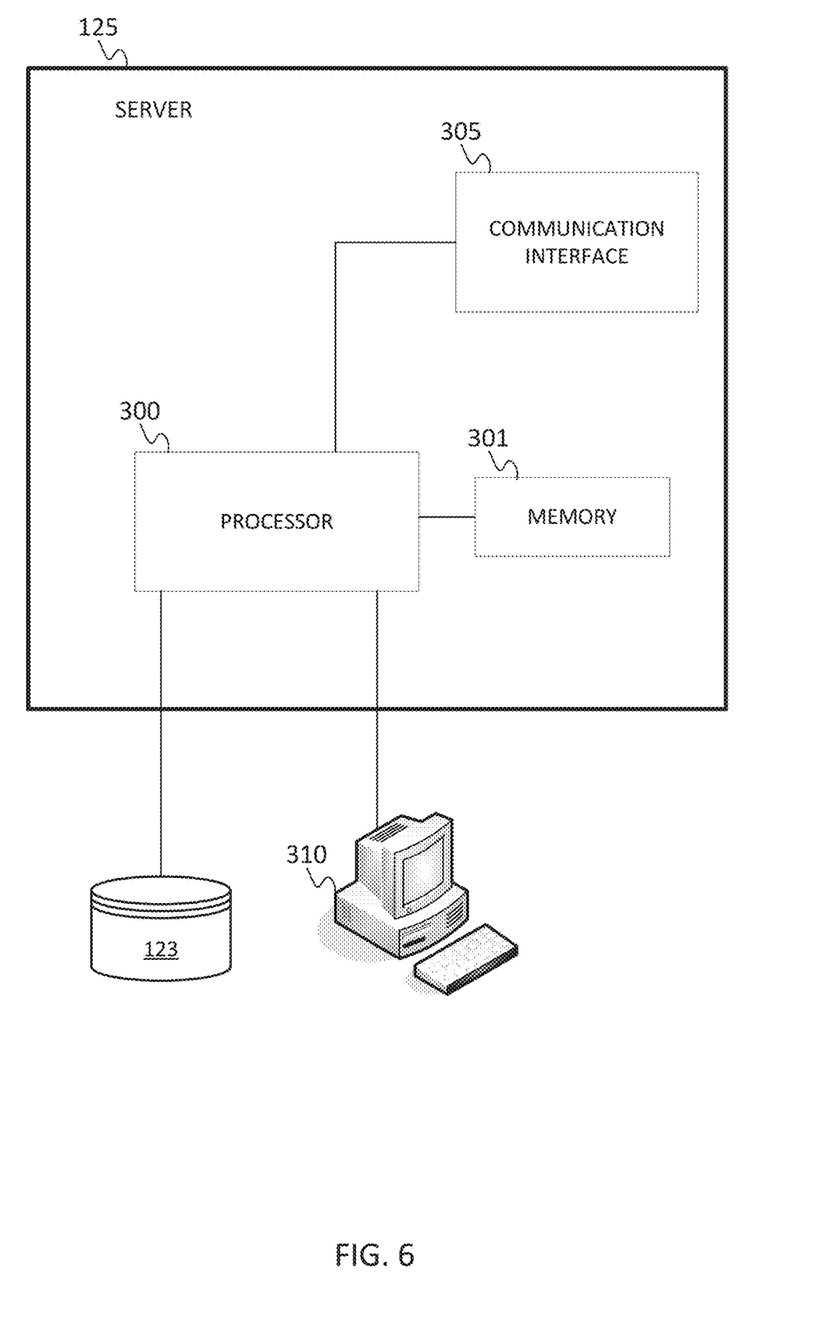
FIG. 6 illustrates an exemplary server of the system of FIG. 4.

FIG. 6 illustrates an exemplary server of the geographic or navigation system of FIG. 4. The server 125 includes a processor 300, a communication interface 305, and a memory 301. The server 125 may be coupled to a database 123 and a workstation 310. The database 123 may be a geographic database. The workstation 310 may be used as an input device for the server 125. In addition, the communication interface 305 is an input device for the server 125. The communication interface 305 may receive data indicative of inputs made via the mobile device 122.

In an embodiment, the memory 301 may be operable to store a plurality of data points associated with a mobile device and/or a vehicle. The plurality of data points may be generated by a mobile device at particular times while traveling a road or path through a geographic area. Also, the processor 300 may be configured to cause the server 125 to connect the data points with a curve involving a series of splines defined by curve functions using mobile device data, and optimize the shape of the splines by applying a scaling factor to the curve functions. The scaling factor may be applied to a curve function by applying the scaling factor to parameters that are used to define the curve function.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In an embodiment, a non-transitory computer-readable medium includes instructions operable to cause a computer to identify a set of mobile device data points associated with a vehicle, the plurality of data points indicating a position, heading, and speed of the vehicle at particular times while traveling a road, connect the data points with a curve comprising a series of splines defined by curve functions derived from trajectory data determined using the position, heading, and speed for the data points, optimize the shape of the splines by applying a scaling factor to curve parameters derived from the trajectory data, and associate the optimized curve with the road.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:

identifying, by a processor, a set of mobile device data points generated by at least one sensor of a vehicle traveling along a path from a plurality of mobile device data points, the set of mobile device data points indicating a position of the vehicle, a heading of the vehicle, and a speed of the vehicle at particular times while traveling a road;

filtering the plurality of mobile device points to remove invalid data points, wherein a data point is determined invalid when a time difference between temporally sequential data points is larger than a specified value;

connecting, by the processor, the set of mobile device data points with a curve comprising a series of splines defined by curve functions using parameters derived from the position, the heading, and the speed for the plurality of mobile device data points;

optimizing, by the processor, the curve by applying at least one scaling factor to the parameters, wherein optimizing comprises more closely approximating the path of the vehicle;

associating, by the processor, the optimized curve with the road;

storing an association between the optimized curve and the road in a geographic database stored in a memory;

generating a road geometry map wherein the road in the geometry map is represented by the optimized curve; and providing for autonomous control of a subsequent vehicle along the optimized curve.

2. The method of claim 1, wherein the curve functions can be represented as:

$$p(t)=(2t^3-3t^2+1)p_0+(t^3-2t^2+t)m_0+(-2t^3+3t^2)p_1+(t^3-t^2)m_1$$

where t is a given spline variable;

p(t) is a position at the given spline variable t;

p₀ is an initial position of a spline indicated by the first mobile device data point;

p₁ is an ending position of the spline indicated by the second mobile device data point;

m₀ is a heading parameter determined for the first mobile device data point; and m₁ is a heading parameter determined for the second mobile device data point.

3. The method of claim 2, wherein the heading parameters are determined according to:

$$m = \Delta t_{1-0} \times v$$

where $\Delta t_{1-0}$ is a difference in time between the second particular time and the first particular time; and v is the speed associated with the first or the second mobile data point respectively.

4. The method of claim 1, wherein a data point is determined invalid when a speed associated with the data point is below a minimum speed threshold.

5. The method of claim 1, wherein a data point is determined invalid when a speed required for the vehicle to travel between associated locations of the data point and a temporally sequential data point is larger than a maximum speed threshold.

6. The method of claim 1, wherein the optimizing comprises:
iteratively applying scaling factors from an established range of scaling factors; and
selecting the at least one scaling factor that includes a maximum number of data points within a specified distance of an optimized curve resulting from application of the scaling factors.

7. The method of claim 1, further comprising:
generating a plurality of optimized curves for other sets of mobile data points from the plurality of mobile device data points; and
producing a merged curve representative of the road geometry based on the plurality of curves.

8. The method of claim 1, further comprising: using the generated road geometry map and the optimized curve for autonomous vehicle guidance.

9. The method of claim 1, wherein the at least one sensor comprises a location sensor and at least one of a magnetic sensor or accelerometer, wherein the position of the vehicle is obtained from a location sensor and wherein the heading of the vehicle is obtained from the at least one of a magnetic sensor or accelerometer.

10. The method of claim 1, wherein the data representing the road network comprises at least a road segment and at least two node points; and
wherein the road segment represents a section of the road between the two node points and the two node points indicate a start and an end point of the road segment or an intersection of two or more road segments.

11. An apparatus comprising:
at least one processor; and
at least one memory including computer program code and operable to store a plurality of data points associated with a vehicle, the plurality of data points generated by a mobile device at particular times while traveling a road;
the at least one memory and the computer program code configured to, with the at least one processor, cause the apparatus at least to:
identify the plurality of mobile device data points generated by at least one sensor of a vehicle traveling along a path from a plurality of mobile device data points, the set of mobile device data points indicating a position of the vehicle, a heading of the vehicle, and a speed of the vehicle at particular times while traveling a road;
filter the plurality of mobile device data points to remove invalid data points, wherein a data point is determined invalid when a time difference between temporally sequential data points is larger than a specified value;
connect the plurality of mobile device data points with a curve comprising a series of splines defined by curve functions using mobile device data generated by the mobile device, wherein the curve functions are represented as:

$$p(t) = (2t^3 - 3t^2 + 1)p_0 + (t^3 - 2t^2 + t)m_0 + (-2t^3 + 3t^2)p_1 + (t^3 - t^2)m_1$$

where t is a given incremental spline variable where t is zero (0) at a first mobile device data point and t is one (1) at a second mobile device data point;

p(t) is a position at the given spline parameter t;

p₀ is an initial position of a spline indicated by the first data point;

p₁ is an ending position of the spline indicated by the second data point;

m₀ is a heading determined for the first data point; and m₁ is a heading determined for the second data point;

optimize the shape of the splines by applying a scaling factor to the curve functions, wherein optimizing the shape of the splines comprises more closely approximating a path of the vehicle;

associate the optimized curve with the road;

store an association between the optimized curve and the road in a geographic database stored in the at least one memory;

generate a road geometry map wherein the road in the geometry map is represented by the optimized curve; and provide for guidance of a vehicle along the optimized curve.

12. The apparatus of claim 11, wherein the headings are determined according to:

$$m = \Delta t_{1-0} \times v$$

where $\Delta t_{1-0}$ is a difference in time between the second particular time and the first particular time; and v is the speed associated with the first point or the second data point respectively.

13. The apparatus of claim 11, wherein the at least one memory and the computer program code further configured to, with the at least one processor, cause the apparatus at least to:
filter a collection of data points to remove invalid data points; and
connect the filtered data points with the curve.

14. The apparatus of claim 13, wherein a data point is determined invalid when a time difference between temporally sequential data points is larger than a specified value.

15. The apparatus of claim 13, wherein a data point is determined invalid when a speed associated with the data point is below a minimum speed threshold.

16. A non-transitory computer readable medium including instructions that when executed on a computer are operable to:
identify a plurality of mobile device data points generated by at least one sensor of a vehicle traveling along a path from a plurality of mobile device data points, the set of mobile device data points indicating a position of the vehicle, a heading of the vehicle, and a speed of the vehicle at particular times while traveling a road;

filter the plurality of mobile device data points to remove invalid data points, wherein a data point is determined invalid when a speed associated with the data point is below a minimum speed threshold;
connect the plurality of mobile device data points with a curve comprising a series of cubic Hermite splines defined by curve functions;
optimize the shape of the splines by applying at least one scaling factor to the curve functions, wherein optimizing comprises more closely approximating a path of the mobile device;
associate the optimized curve with a path in the geographic area;
store an association between the optimized curve and the road in a geographic database stored in a memory;
generate a road geometry map wherein the road in the geometry map is represented by the optimized curve; and
provide for guidance of a vehicle along the optimized curve.

17. The medium of claim 16, wherein the instructions are further configured to:
generate a plurality of curves from a plurality of sets of mobile device data points; and
merge the plurality of curves into a single curve representative of the path.

18. The medium of claim 16, wherein the instructions are further configured to:
iteratively apply scaling factors from an established range of scaling factors; and
select the at least one scaling factor that includes a maximum number of data points within a specified distance of an optimized curve resulting from application of the scaling factors.

* * * * *